US012017475B2

(12) United States Patent
Seo et al.

(10) Patent No.: US 12,017,475 B2
(45) Date of Patent: Jun. 25, 2024

(54) DECORATION MATERIAL

(71) Applicant: LX Hausys, Ltd., Seoul (KR)

(72) Inventors: Ji Yeon Seo, Seoul (KR); Won Tae Kim, Seoul (KR); Heon Jo Kim, Seoul (KR)

(73) Assignee: LX HAUSYS, LTD., Seoul (KR)

( * ) Notice: Subject to any disclaimer, the term of this patent is extended or adjusted under 35 U.S.C. 154(b) by 0 days.

(21) Appl. No.: 18/019,599

(22) PCT Filed: Aug. 5, 2021

(86) PCT No.: PCT/KR2021/010328
§ 371 (c)(1),
(2) Date: Jun. 8, 2023

(87) PCT Pub. No.: WO2022/031071
PCT Pub. Date: Feb. 10, 2022

(65) Prior Publication Data

US 2023/0311562 A1 Oct. 5, 2023

(30) Foreign Application Priority Data

Aug. 5, 2020 (KR) ........................ 10-2020-0097860
Jun. 25, 2021 (KR) ........................ 10-2021-0083156
Jun. 25, 2021 (KR) ........................ 10-2021-0083157

(51) Int. Cl.
*B44C 1/17* (2006.01)
*B41M 5/50* (2006.01)
(Continued)

(52) U.S. Cl.
CPC ........... *B44C 1/1754* (2013.01); *B41M 5/502* (2013.01); *B44C 3/02* (2013.01); *B44C 5/04* (2013.01)

(58) Field of Classification Search
CPC ........... B44C 1/1754; B44C 3/02; B44C 5/04; B41M 5/502
(Continued)

(56) References Cited

U.S. PATENT DOCUMENTS 4,887,368 A * 12/1989 Latzke .................. B32B 15/046 36/43
6,551,692 B1 * 4/2003 Dalvey .................. B44C 1/162 428/447

(Continued)

FOREIGN PATENT DOCUMENTS

JP H09-290575 A 11/1997
JP H11-342578 A 12/1999

(Continued)

OTHER PUBLICATIONS

International Search Report dated Nov. 22, 2021 in PCT/KR2021/010328.

(Continued)

*Primary Examiner* — Betelhem Shewareged
(74) *Attorney, Agent, or Firm* — Panitch Schwarze Belisario & Nadel LLP

(57) ABSTRACT

The present application can provide a decoration material in which a printed layer having various designs and colors to meet demands and needs is formed on a basic material layer to have clearness and high adhesion. The present application can also provide a transfer film for manufacturing the decoration material and a method for manufacturing a decoration material using the transfer film.

24 Claims, 2 Drawing Sheets

(51) Int. Cl.
*B44C 1/175* (2006.01)
*B44C 3/02* (2006.01)
*B44C 5/04* (2006.01)

(58) Field of Classification Search
USPC .......................................................... 428/203
See application file for complete search history.

(56) References Cited

U.S. PATENT DOCUMENTS 6,951,671 B2 * 10/2005 Mukherjee ........... B41M 5/0256
428/32.12
2004/0255820 A1 * 12/2004 Chen ........................ B41M 5/52
106/31.13
2019/0054760 A1 * 2/2019 Seo ........................ C09D 11/03

FOREIGN PATENT DOCUMENTS

| | | | |
|---|---|---|---|
| KR | 10-2008-0105341 | A | 12/2008 |
| KR | 10-2015-0110612 | A | 10/2015 |
| KR | 10-2018-0064644 | A | 6/2018 |
| KR | 10-1975192 | B1 | 5/2019 |
| KR | 10-2020-0046476 | A | 5/2020 |

OTHER PUBLICATIONS

Office Action dated Aug. 8, 2022 in KR Application No. 10-2021-0083156.

* cited by examiner (a) (b)

DECORATION MATERIAL

CROSS-REFERENCE TO RELATED APPLICATIONS

This application is a Section 371 of International Application No. PCT/KR2021/010328, filed Aug. 5, 2021, which was published in the Korean language on Feb. 10, 2022 under International Publication No. WO 2022/031071 A1, which claims priority under 35 U.S.C. § 119(b) to Korean Application No. 10-2020-0097860, filed Aug. 5, 2020, Korean Application No. 10-2021-0083156, filed Jun. 25, 2021, and Korean Application No. 10-2021-0083157, filed Jun. 25, 2021, the disclosures of which are incorporated herein by reference in their entireties.

TECHNICAL FIELD

The present application relates to a decorative material, a transfer film, and a manufacturing method of the decorative material.

BACKGROUND ART

Decorative materials such as wallpaper, wall panels, and flooring materials can be manufactured by forming a printed layer on a base material layer.

When forming the printed layer, it is necessary to form a desired design and color on the base material layer naturally, accurately, and clearly.

In addition, it is also necessary to form the printed layer by firmly adhering it to the base material layer.

However, it is not easy to form the printed layer when the base material layer is a natural stone or resin panel.

A representative method of forming the printed layer is a so-called gravure printing method. However, although the gravure method is advantageous in repeatedly forming one specific pattern, various designs cannot be printed differently for each product, so that the flexibility to form the printed layer of various designs to meet rapidly changing consumer demand is reduced.

In addition, the printed layer formed by the gravure printing method is generally monotonous and has limited aesthetics.

As a method of forming the printed layer, a so-called digital printing method is known.

For example, Patent Document 1 discloses a decorative material in which a decorative layer is directly formed on a base material layer by a digital printing method.

When the digital printing method is applied, it is advantageous for changing the design or color of the decorative layer to meet the changing demand.

As disclosed in Patent Document 1, a method of using a so-called transfer film may be considered in addition to a method of directly forming a printed layer on the base material layer.

When the transfer film is used, there is an advantage in that a printed layer of various designs can be easily formed with a high degree of freedom according to needs and requirements.

However, in the transfer method, since the printed layer formed on the transfer film is transferred to the base material layer, it is difficult to form the printed layer on the base material layer with excellent adhesive strength.

In order to solve this problem, a method of using an adhesive layer or the like can be considered when transferring the printed layer of the transfer film, but in this case, total volatile organic compounds (TVOC) of the decorative material are increased.

RELATED ART DOCUMENT

Patent Document

Patent Document 1: Korean Patent Registration No. 10-1975192

DISCLOSURE

Technical Problem

The present application provides a decorative material, a transfer film, and a manufacturing method of the decorative material. The present application is directed to providing a decorative material in which a clear printed layer of various designs and colors meeting demands and needs is formed on a base material layer to have high adhesive strength.

The present application is directed to providing a decorative material in which the printed layer is formed using a transfer method that does not use an adhesive.

The present application is also directed to providing a transfer film suitable for manufacturing the decorative material and a manufacturing method of the decorative material using the film.

Technical Solution

Among the physical properties mentioned in the present specification, when a measured temperature and/or pressure affect the physical properties, the corresponding physical properties refer to physical properties measured at room temperature and/or normal pressure, unless otherwise specified.

In the present application, the term "room temperature" refers to a natural temperature that is not raised or reduced, and may mean, for example, any temperature within a range of about 10° C. to 30° C., about 25° C., or 23° C.

In the present application, the term "atmospheric pressure" is a pressure that is not particularly reduced or increased, and may be about 1 atm, which is usually the same as atmospheric pressure.

Among physical properties mentioned in this specification, when measured humidity affects the physical properties, unless otherwise specified, the physical properties refer to physical properties measured at natural humidity that is not specially adjusted in the measured temperature and pressure state.

A decorative material of the present application may include at least a base material layer and a decorative layer formed on the base material layer. FIG. 1 is an exemplary cross-sectional view of the decorative material, showing a form in which the decorative layer 200 is formed on the base material layer 100.

In the present application, there is no particular limitation on the type of base material layer. As the base material layer, a material used as a base material layer in previously known decorative materials such as wall structures or floor tiles or wallpapers may be used. Examples of such a base material layer include a plastic base material layer such as poly(vinyl chloride) (PVC) or poly(ethylene terephthalate) (PET), a paper- or a wood-based base material layer, and/or an inorganic base material layer such as a ceramic base material layer. Although the base material layer is usually in the form of a board, the shape of the base material layer is not limited in the present application, and various types of base material layers may be used depending on the use of a decorative material. A size such as thickness of the base material layer can also be selected according to the purpose.

The decorative material of the present application includes the decorative layer on at least one surface of the base material layer. The term "decorative layer" refers to a layer including a printed layer of the desired design and color, which may be a mono-layer or a multi-layer structure.

In the decorative material, the decorative layer may exhibit high adhesive strength to the base material layer. For example, the peel strength of the decorative layer to the base material layer may be 1.6 Kgf/2.0 cm or more. In another example, the peel strength may be 1.8 Kgf/2.0 cm or more, 2.0 Kgf/2.0 cm or more, 2.2 Kgf/2.0 cm or more, 2.4 Kgf/2.0 cm or more, 2.6 Kgf/2.0 cm or more, 2.8 Kgf/2.0 cm or more, 3.0 Kgf/2.0 cm or more, 3.2 Kgf/2.0 cm or more, 3.4 Kgf/2.0 cm or more, 3.6 Kgf/2.0 cm or more, 3.8 Kgf/2.0 cm or more, or 4.0 Kgf/2.0 cm or more. An upper limit of this peel strength is not particularly limited, but may usually be about 10 Kgf/2.0 cm or less, 9 Kgf/2.0 cm or less, 8 Kgf/2.0 cm or less, 7 Kgf/2.0 cm or less, 6 Kgf/2.0 cm or less, Kgf/2.0 cm or less, 4.5 Kgf/2.0 cm or less, or 4 Kgf/2.0 cm or less.

The peel strength is the strength at the time when the decorative layer formed on the base material layer is peeled off the base material layer, interlayer peeling occurs between arbitrary layers, or when only a portion of any single layer is torn and peeled off.

That is, the decorative material of the present application basically includes a base material layer and a decorative layer formed on one surface of the base material layer, layers other than the base material layer and the decoration layer may also be present (for example, another layer may be present between the base material layer and the decoration layer, above or below the base material layer, or above or below the decoration layer), and the decorative layer or the base material layer may also be formed as a multi-layer rather than a mono-layer.

When the decorative layer is peeled off the base material layer in order to measure the peel strength of the decorative material, although peeling may occur between the base material layer and the decorative material, not all of the decorative material is peeled off the base material layer, but a part of the decorative material is torn off and separated, or peeling between arbitrary layers inside a multi-layered decorative layer, peeling between the decorative layer and other layers, peeling between the base material layer and other layers, or peeling between other layers may occur.

Therefore, the peel strength of the decorative layer referred to in the present application means the peel strength measured at the time when various types of peeling or falling first occur in a process of peeling the decorative layer off a base material layer.

The peel strength is evaluated by referring to KS M 3802, a decoration laboratory test standard. Specifically, a specimen is manufactured by cutting the decorative material into a dogbone shape having a width of 20 mm, a length of 250 mm, and a thickness of about 5 mm. Then, the specimen is kept in hot water at about 80° C. for about 1 hour. Then, both ends of the specimen are fixed in a tensile tester, and the peel strength was measured at a peel rate of about 200 mm/min and a peel angle of 180 degrees. FIG. 6 is a view showing a process of measuring the peel strength.

A small tensile tester of AMATEK/LLOYD INSTRUMENTS may be used as the tensile tester used in the above process, and a 5 kN load cell may be used as a load cell.

In the present application, in particular, the high adhesive strength can be achieved even when the decorative layer is formed by a transfer method without using an adhesive.

The high adhesive strength can be achieved through the use of an adherend-dependent peel force variable layer and/or ink to be described below.

In the present application, since the decorative layer can be formed to have high adhesive strength to a base material layer without using an adhesive, the decorative material can be composed of only materials that do not contain harmful substances or have a minimally limited content thereof.

Accordingly, the decorative material of the present application may exhibit low total volatile organic compounds (TVOC) and formaldehyde (HCHO) contents.

For example, an amount of TVOC generated in the decorative material of the present application may be 5 $mg/m^3$ or less, 4.5 $mg/m^3$ or less, 4 $mg/m^3$ or less, 3.5 $mg/m^3$ or less, 3 $mg/m^3$ or less, 2.5 $mg/m^3$ or less, 2 $mg/m^3$ or less, 1.5 $mg/m^3$ or less, 1 $mg/m^3$ or less, 0.9 $mg/m^3$ or less, 0.85 $mg/m^3$ or less, 0.8 $mg/m^3$ or less, 0.75 $mg/m^3$ or less, 0.7 $mg/m^3$ or less, 0.65 $mg/m^3$ or less, 0.6 $mg/m^3$ or less, 0.55 $mg/m^3$ or less, 0.5 $mg/m^3$ or less, 0.45 $mg/m^3$ or less, 0.4 $mg/m^3$ or less, 0.35 $mg/m^3$ or less, 0.3 $mg/m^3$ or less, 0.25 $mg/m^3$ or less, 0.2 $mg/m^3$ or less, 0.15 $mg/m^3$ or less, 0.1 $mg/m^3$ or less, or 0.08 $mg/m^3$ or less per hour. A lower limit of the amount of generated TVOC is not limited. Since it is necessary to limit the emission of harmful substances as much as possible, for example, the lower limit of the amount of TVOC generated may be about 0 $mg/m^3$ per hour.

An amount of HCHO generated in the decorative material of the present application may be about 0.1 $mg/m^3$ or less, 0.09 $mg/m^3$ or less, 0.08 $mg/m^3$ or less, 0.07 $mg/m^3$ or less, 0.06 $mg/m^3$ or less, 0.05 $mg/m^3$ or less, 0.04 $mg/m^3$ or less, 0.03 $mg/m^3$ or less, 0.02 $mg/m^3$ or less, 0.015 $mg/m^3$ or less, or 0.01 $mg/m^3$ or less per hour. There is no limit on the lower limit of the amount of generated HCHO. Since emission of harmful substances needs to be limited as much as possible, for example, the lower limit of the amount of formaldehyde generated may be about 0 $mg/m^3$ per hour.

The amounts of generated TVOC and formaldehyde can be measured by a method known in the art, and can be confirmed, for example, by a method described in KS M 0000-1 standard.

The decorative layer may include, for example, at least a printed layer and an adherend-dependent peel force variable layer. In this specification, the term "adherend-dependent peel force variable layer" refers to a layer whose adhesion varies depending on the adherend. For example, the adherend-dependent peel force variable layer may exhibit low adhesion to a certain adherend and high adhesion to another adherend at the same time. For example, in the present application, the adherend-dependent peel force variable layer may be a layer that allows the decorative layer in the decorative material to exhibit the above-described high adhesive strength to the base material layer, and at the same time, exhibit low adhesion in which releasability for a specific base material (for example, a polyester film such as a PET film) can be expressed. The type of base material layer exhibiting high adhesive strength is not particularly limited, but may be a PVC base material layer in one example.

Properties of the adherend-dependent peel force variable layer may be exhibited by components included in the peel force variable layer in one example. For example, when the peel force variable layer includes silicone and/or fluorine compounds and polyvinyl chloride to be described below, the above properties can be exhibited.

The properties of the adherend-dependent peel force variable layer enable the decorative layer to be formed on the decorative material by a transfer process, and at the same time, a transferred decorative layer exhibits high adhesion with another layer (for example, a polyvinyl chloride layer present on the top and/or bottom of the decorative layer in the decorative material) in the decorative material.

The adherend-dependent peel force variable layer may have a mono-layer structure or a multi-layer structure. The adherend-dependent peel force variable layer may also be formed to exhibit excellent printability suitable for forming a printed layer, particularly with respect to ink for a digital printing.

The adherend-dependent peel force variable layer may be formed of a material to be described below.

In one example, the adherend-dependent peel force variable layer may include a silicone compound and/or a fluorine compound. The compound can cause the adherend-dependent peel force variable layer to exhibit the above-described releasability depending on the base material. There is no particular limitation on the type of silicone and/or fluorine compound that can be applied.

For example, as the compound, a silicone or fluorine compound usually applied to a release layer of a release film in the art may be applied. As the silicone compound, Evonik's Protect 5000 or 5001 product may be exemplified, and as the fluorine compound, 3M's SRA-270 or 451 product may be exemplified.

The adherend-dependent peel force variable layer of the present application may include a compound capable of exhibiting releasability different from the silicone and/or fluorine compound instead of the silicone and/or fluorine compound. In another example, the adherend-dependent peel force variable layer may include a compound capable of exhibiting different types of releasability along with the silicone and/or fluorine compound. As the compound capable of exhibiting the different types of releasability, for example, materials known in the art as long-chain alkyl-based release agents and/or fatty acid amide-based release agents may be exemplified, but are not limited thereto.

The adherend-dependent peel force variable layer may include other polymers such as PVC along with the above materials. The polyvinyl chloride may be included in an appropriate ratio along with the silicone and/or fluorine compound, so that the adherend-dependent peel force variable layer may contribute to exhibiting adhesive performance that varies depending on the base material.

For example, the adherend-dependent peel force variable layer including the polyvinyl chloride along with the silicone and/or fluorine compound exhibits low peel strength to an adherend such as a polyester film, but may exhibit high peel strength to another layer including polyvinyl chloride. In the case of the decorative material, the base material layer or other layers often include polyvinyl chloride, and therefore the adherend-dependent peel force variable layer including polyvinyl chloride may contribute to securing high peel strength of the decorative layer to the base material layer by increasing the interfacial adhesive force with other layers (for example, a transparent layer to be described below) including polyvinyl chloride in the decorative material.

The polyvinyl chloride component that can be applied in the above is not particularly limited, and conventional components applied to the manufacture of decorative materials and the like may be used. For example, as the polyvinyl chloride component, a component having a weight average molecular weight within a range of about 2,000 to 50,000 may be used. In another example, the weight average molecular weight of the polyvinyl chloride component may be about 3,000 or more, 4,000 or more, 5,000 or more, 6,000 or more, 7,000 or more, 8,000 or more, 9,000 or more, 10,000 or more, 15,000 or more, 20,000 or more, 22,000 or more, 24,000 or more, 25,000 or more, and about 45,000 or less, 40,000 or less, 35,000 or less, 30,000 or less, or 28,000 or less.

When the PVC component is included in the adherend-dependent peel force variable layer, the component may be included at about 30 to 130 parts by weight, relative to 100 parts by weight of the total amount of the silicone and/or the fluorine compound. Under this amount, the adherend-dependent peel force variable layer can exhibit appropriate printability and durability, while desired adhesive performance can be exhibited depending on the base material. In another example, the amount of polyvinyl chloride may be about 40 parts by weight or more, 50 parts by weight or more, 60 parts by weight or more, 70 parts by weight or more, or 75 parts by weight or more, and about 120 parts by weight or less, 110 parts by weight or less, 100 parts by weight or less, 90 parts by weight or less, or 85 parts by weight or less.

The adherend-dependent peel force variable layer may include a resin emulsion along with the above materials. The emulsion may be an aqueous emulsion, and such emulsion may be a non-ionic, cationic or anionic emulsion. The aqueous emulsion is a polymer formed by polymerizing monomers in an aqueous medium in the presence of a non-ionic, cationic and/or anionic surfactant.

Types of the resin emulsion are not particularly limited, and for example, an acrylic resin emulsion, a polyurethane resin emulsion, and/or a PVC resin emulsion may be used.

The acrylic resin included in the acrylic resin emulsion may include, for example about 10 to 90% by weight or 20 to 80% by weight of (meth)acrylic acid ester; and about 10 to 90% or 20 to 80% by weight of polymerized units of other monomers. As the other monomers, ethylenically unsaturated monoacids, diacids, or other ethylenically unsaturated monomers may be exemplified.

As the (meth)acrylic acid esters, methyl (meth)acrylate, ethyl (meth)acrylate, propyl (meth)acrylate, isopropyl (meth)acrylate, butyl (meth)acrylate, isobutyl (meth)acrylate, tert-butyl (meth)acrylate, hexyl (meth)acrylate, 2-ethylhexyl (meth)acrylate, octyl (meth)acrylate, dodecyl (meth) acrylate, octadecyl (meth)acrylate, octenyl (meth)acrylate, stearyl (meth)acrylate, and the like may be exemplified, but are not limited thereto.

As the ethylenically unsaturated monoacid or diacids, (meth)acrylic acid, crotonic acid, maleic acid, fumaric acid, itaconic acid, citraconic acid and/or senecioic acid, a monoalkyl ester compound of the diacid, and the like may be exemplified, but are not limited thereto.

As the other ethylenically unsaturated monomers, hydroxyalkyl (meth)acrylates, such as 2-hydroxyethyl (meth)acrylate (wherein an alkyl group has 1 to 20, 1 to 16, 1 to 12, or 1 to 8 or 1 to 4 carbon atoms, and the alkyl group may be straight-chain, branched-chain or cyclic), ethylene, propylene, butylene, isobutylene, vinyl chloride, vinylidene chloride, (meta)acrylonitrile, styrene, alpha-methylstyrene, vinyl formate, vinyl acetate, vinyl propionate, vinyl butyrate, vinyl isobutyrate, vinyl valerate, vinyl 2-ethylhexanoate, vinyl isooctanoate, vinyl nonoate, vinyl decanoate, vinyl pivalate, vinyl versatate, cetyl vinyl ether, dodecyl vinyl ether, di-butyl maleate, di-2-ethylhexyl maleate, (meth)acrylamide, N-(hydroxymethyl)acrylamide, N-isopropyl acrylamide, vinylsulfonic acid, 2-acrylamido-2-methylpropanesulfonic acid, styrene-p-sulfonic acid, and/or allyl alcohol may be exemplified, but are not limited thereto.

If necessary, the acrylic resin may optionally include a crosslinking monomer, and this crosslinking monomer may be included, for example, up to 3% by weight, based on the total monomers of the acrylic resin.

As the crosslinking monomer, methylene-bis-(meth)acrylamide, a di(meth)acrylate compound of a dihydric or polyhydric alcohol having 2 to 6 carbon atoms, a poly(meth) acrylate compound, divinyldioxane, diallyl phthalate, a diallyl ether compound or a triallyl ether compound of a dihydric or polyhydric alcohol (e.g. pentaerythritol), and/or a diacrylate of polyethylene glycol or polypropylene glycol may be exemplified, but are not limited thereto.

Such a resin emulsion may be included in the adherend-dependent peel force variable layer in an amount of about 5 to 70% by weight. In another example, this amount may be 10% by weight or more, 15% by weight or more, 20% by weight or more, or 25% by weight or more, and about 65% by weight or less, 60% by weight or less, 55% by weight or less, 50% by weight or less, 45% by weight or less, 40% by weight or less, or 35% by weight or less.

In addition, the resin emulsion in the adherend-dependent peel force variable layer may be included at about 70 to 170 parts by weight, relative to 100 parts by weight of the total amount of the silicone and/or the fluorine compound. In another example, the resin emulsion may be included at about 80 parts by weight or more, 90 parts by weight or more, 100 parts by weight or more, 110 parts by weight or more, or 115 parts by weight or more, and about 160 parts by weight or less, 150 parts by weight or less, 140 parts by weight or less, 130 parts by weight or less, or 125 parts by weight or less, relative to 100 parts by weight of the total amount of the silicone and/or the fluorine compound.

Under the above amount, the adherend-dependent peel force variable layer can exhibit variable adhesive strength depending on the base material, and can further exhibit appropriate printability.

The adherend-dependent peel force variable layer may include a metal salt in addition to the components. This metal salt, if necessary, can be dissociated into cations and anions to improve the printability of the adherend-dependent peel force variable layer. A suitable metal salt may be used without particular limitation, and for example, one or more of a nitrate, sulfate, or chloride of metals, such as Zn, Cu, Fe, Mn, Li, Ag, Mg, and/or Ca may be selected and used.

The metal salt may be used in an amount of about 1 to 20 parts by weight, relative to 100 parts by weight of the resin emulsion. In another example, the amount may be 3 parts by weight or more, 5 parts by weight or more, or 7 parts by weight or more, and about 18 parts by weight or less, 16 parts by weight or less, 14 parts by weight or less, 12 parts by weight or less, 10 parts by weight or less, or 9 parts by weight or less. Under this amount, it is possible to make the adherend-dependent peel force variable layer exhibit appropriate printability while adhesion performance that varies depending on a base material of the adherend-dependent peel force variable layer is not deteriorated, and in some cases, is improved.

The adherend-dependent peel force variable layer may include an inorganic filler in addition to the above components. Such an inorganic filler may serve to improve the durability of the layer in the adherend-dependent peel force variable layer, and in some cases, the adhesion performance and/or printability of the adherend-dependent peel force variable layer, which varies depending on the base material, may be improved.

The inorganic filler may include, for example, one or more selected from kaolin, silica, alumina, $TiO_2$, $Ca(OH)_2$, CaO, $Al(OH)_3$, $Al_2O_3$, and calcium carbonate.

As the inorganic filler, for example, a filler having an average particle diameter (D50 particle diameter according to ISO 13320-1) within a range of about 0.5 μm to 14 μm, 1 μm to 12 μm, 1 μm to 10 μm, 1 μm to 8 μm, 1 μm to 6 μm, or 1 μm to 4 μm may be used.

As the inorganic filler, those having a BET specific surface of about 350 $m^2/g$ or more, 450 $m^2/g$ or more, 550 $m^2/g$ or more, or 650 $m^2/g$ or more according to an ISO 9277 standard may also be used.

As the inorganic filler, those having a porosity and a so-called DOA (dioctyl) absorption capacity of about 200 to 300 ml, 220 to 290 ml, 240 to 280 ml, or 250 and 270 ml per 100 g may be used.

The inorganic filler having the above properties may contribute to improving durability, printability, and/or adhesive performance of the adherend-dependent peel force variable layer.

The inorganic filler may be used in an amount of about 2 to 100 parts by weight, relative to 100 parts by weight of the resin emulsion. Under this amount, it is possible to make the adherend-dependent peel force variable layer exhibit appropriate durability and/or printability while adhesion performance that varies depending on a base material of the adherend-dependent peel force variable layer is not deteriorated, and in some cases, is improved. In another example, the above amount may be about 5 parts by weight or more, 10 parts by weight or more, 15 parts by weight or more, 20 parts by weight or more, 25 parts by weight or more, 30 parts by weight or more, 35 parts by weight or more, 40 parts by weight or more, or 45 parts by weight or more, and about 95 parts by weight or less, 90 parts by weight or less, 85 parts by weight or less, 80 parts by weight or less, 75 parts by weight or less, 70 parts by weight or less, 65 parts by weight or less, 60 parts by weight or less, or 55 parts by weight or less.

The adherend-dependent peel force variable layer may include other necessary additives in addition to the components. Examples of such additives include, but are not limited to, thickeners, leveling agents, and/or antifoaming agents. The amounts of these additives are selected according to the purpose and are not particularly limited, and for example, when included, the thickener may be included in an amount of 0.1 to 2 parts by weight, and the leveling agent may be included in an amount of 0.1 to 2 parts by weight, and the antifoaming agent may be included in an amount of 0.05 to 2 parts by weight, relative to 100 parts by weight of the resin emulsion Such an adherend-dependent peel force variable layer may be formed of a mono-layer or may be formed of a multi-layer.

For example, when formed as a mono-layer, a coating solution including all of the above-described components in a proper ratio is prepared, and after coating the coating solution, an adherend-dependent peel force variable layer may be formed through an appropriate drying and/or curing process.

When formed in a multi-layer, the adherend-dependent peel force variable layer may be formed by dividing, for example, a layer mainly including the silicon- and/or fluorine-based compound and a layer mainly including the resin emulsion. For example, an adherend-dependent peel force variable layer may be formed by forming a layer including the silicone and/or fluorine compound and forming a layer including the resin emulsion in contact with the layer.

In this case, other components of the adherend-dependent peel force variable layer may be present separately in appropriate layers among the two layers. For example, the above-mentioned PVC may be included in the layer including the silicone and/or fluorine compound among the two layers, and other components such as metal salts or inorganic fillers may be included in the layer including the resin emulsion.

In one example, when the adherend-dependent peel force variable layer has a multi-layer structure, the multi-layer structure may include a first layer including the silicone and/or fluorine compound and a second layer including the resin emulsion. In this case, the polyvinyl chloride may be included in the first layer, and the metal salt and the inorganic filler may be included in the second layer. Even when it is formed in a multi-layered structure, a content ratio of each of components is as described above.

Such an adherend-dependent peel force variable layer may have a thickness within a range of about 0.1 to 20 μm. In another example, the thickness may be about 0.3 μm or more, 0.5 μm or more, 0.7 μm or more, 0.9 μm or more, 1 μm or more, or 1.5 μm or more, and about 19 μm or less, 18 μm or less, 17 μm or less, 16 μm or less, 15 μm or less, 14 μm or less, 13 μm or less, 12 μm or less, 11 μm or less, 10 μm or less, 9 μm or less, 8 μm or less, 7 μm or less, 6 μm or less, 5 μm or less, or 4 μm or less.

When the adherend-dependent peel force variable layer is formed in the multi-layer structure, a thickness of each layer can be controlled in an appropriate ratio. For example, when the adherend-dependent peel force variable layer is divided into a layer including the silicone and/or fluorine compound (for example, the first layer) and a layer including the resin emulsion (for example, the second layer), each layer may be formed to have a thickness within a range of about 0.1 to 10 μm. In another example, a thickness of each layer may be about 0.3 μm or more, 0.5 μm or more, 0.7 μm or more, 0.9 μm or more, 1 μm or more, or 1.5 μm or more, and about 10 μm or less, 9 μm or less, 8 μm or less, 7 μm or less, 6 μm or less, 5 μm or less, or 4 μm or less.

In addition, a thickness ratio of two layers in the multi-layer structure, for example, a ratio (A/B) of a thickness (A) of the layer including the resin emulsion (for example, the second layer) to a thickness (B) of the layer including the silicone and/or fluorine compound (for example, the first layer) may be within a range of about 0.4 to 10. In another example, the ratio (A/B) may be about 0.6 or more, 0.8 or more, 1 or more, 1.2 or more, 1.4 or more, 1.6 or more, 1.8 or more, or 2 or more, and about 9 or less, 8 or less, 7 or less, 6 or less, 5 or less, 4 or less, 3 or less, or 2 or less.

The above thickness property may be advantageous for forming the adherend-dependent peel force variable layer having different adhesive strength depending on the adherend and excellent printability.

As an example of the case where the adherend-dependent peel force variable layer has a multi-layer structure, there is a case where the variable layer is formed by being divided into an ink receiving layer and a primer layer. In this case, the variable layer may include the ink receiving layer and the primer layer. The variable layer may or may not include other layers other than the ink receiving layer and the primer layer, if necessary. The ink receiving layer and the primer layer may be in contact with each other. In another example, the adherend-dependent peel force variable layer may include only one of the ink receiving layer and the primer layer.

In the above example, the ink receiving layer may be the same layer as the above-described second layer, and the primer layer may be the same layer as the first layer.

The ink receiving layer may include the above-described resin emulsion. Specific types of the resin emulsion are as described above. In the ink receiving layer, the resin emulsion may be included at about 40 to 80% by weight, based on the total weight of the ink receiving layer. In another example, the amount may be about 45% by weight or more, 50% by weight or more, or 55% by weight or more, and about 75% by weight or less, 70% by weight or less, or 65% by weight or less.

In addition, the resin emulsion may be included in the ink receiving layer in an amount of about 70 to 170 parts by weight, relative to 100 parts by weight of the total amount of silicone and/or fluorine compound in the primer layer described below. In another example, the resin emulsion may be 80 parts by weight or more, 90 parts by weight or more, 100 parts by weight or more, 110 parts by weight or more, or 115 parts by weight or more, and about 160 parts by weight or less, 150 parts by weight or less, 140 parts by weight or less, 130 parts by weight or less, or 125 parts by weight or less, relative to 100 parts by weight of a total amount of the silicone and/or the fluorine compound.

Under the above amount, the ink receiving layer and/or the primer layer can exhibit a variable adhesive strength depending on the base material, and can further exhibit appropriate printability.

The ink receiving layer may include a metal salt, an inorganic filler, a thickener, a leveling agent, and/or an antifoaming agent among components included in the adherend-dependent peel force variable layer along with the resin emulsion.

In this case, detailed descriptions of the components are the same as in the adherend-dependent peel force variable layer.

The metal salt may be included in the ink receiving layer in an amount of about 1 to about 20 parts by weight, relative to 100 parts by weight of the resin emulsion. In another example, the amount may be 3 parts by weight or more, 5 parts by weight or more, or 7 parts by weight or more, and about 18 parts by weight or less, 16 parts by weight or less, 14 parts by weight or less, 12 parts by weight or less, 10 parts by weight or less, or 9 parts by weight or less. Under this amount, it is possible to exhibit appropriate printability while not deteriorating, and in some cases, improving adhesive performance, which varies depending on a desired base material.

The inorganic filler may be included in the ink receiving layer in an amount of about 2 to about 100 parts by weight, relative to 100 parts by weight of the resin emulsion. Under this amount, it is possible to exhibit durability and/or printability while not deteriorating, and in some cases, improving adhesive performance, which varies depending on the above-described base material. In another example, the above amount may be about 5 parts by weight or more, 10 parts by weight or more, 15 parts by weight or more, 20 parts by weight or more, 25 parts by weight or more, 30 parts by weight or more, 35 parts by weight or more, 40 parts by weight or more, or 45 parts by weight or more, and about 95 parts by weight or less, 90 parts by weight or less, 85 parts by weight or less, 80 parts by weight or less, 75 parts by weight or less, 70 parts by weight or less, 65 parts by weight or less, 60 parts by weight or less, or 55 parts by weight or less.

When included, the thickener may be included in the ink receiving layer in an amount of 0.1 to 2 parts by weight, and the leveling agent may be included in the ink receiving layer in an amount of 0.1 to 2 parts by weight, and the antifoaming agent may be included in the ink receiving layer in an amount of 0.05 to 2 parts by weight, relative to 100 parts by weight of the resin emulsion In the above structure, the primer layer includes the above-described silicone compound and/or fluorine compound, and may include other polymers such as the above-described PVC along with this material. In this case, details of the silicone compound, the fluorine compound and the polyvinyl chloride are as described above.

The primer layer may include about 40 to 70% by weight of the silicone and/or fluorine compound based on the total weight of the primer layer. In another example, the above proportion may be about 45% by weight or more or 50% by weight or more, and about 65% by weight or less or 60% by weight or less.

In the primer layer, the silicone and/or fluorine compound may be included in an amount of about 60 to 100 parts by weight, relative to 100 parts by weight of the resin emulsion included in the ink receiving layer. In another example, the amount may be about 65 parts by weight or more, about 70 parts by weight or more, about 75 parts by weight or more, or about 80 parts by weight or more, and about 95 parts by weight or less, 90 parts by weight or less, or 85 parts by weight or less.

In the primer layer, the PVC may be included at about 30 to 130 parts by weight, relative to 100 parts by weight of the total amount of the silicone and/or fluorine compound. In another example, the proportion of PVC may be about 40 parts by weight or more, 50 parts by weight or more, 60 parts by weight or more, 70 parts by weight or more, or 75 parts by weight or more, and about 120 parts by weight or less, 110 parts by weight or less, 100 parts by weight or less, 90 parts by weight or less, or 85 parts by weight or less.

Under the above proportion, a laminate of the ink receiving layer and the primer layer can exhibit the above-described properties, for example, appropriate printability and durability, and adhesive performance that varies depending on the base material.

Each of the ink receiving layer and the primer layer may have a thickness within a range of about 0.1 μm to about 10 μm. In another example, a thickness of the ink receiving layer and the primer layer may be about 0.3 μm or more, 0.5 μm or more, 0.7 μm or more, 0.9 μm or more, 1 μm or more, or 1.5 μm or more, and about 10 μm or less, 9 μm or less, 8 μm or less, 7 μm or less, 6 μm or less, 5 μm or less, or 4 μm or less.

In addition, a ratio (A/B) of a thickness (A) of the ink receiving layer to the thickness (B) of the primer layer may be within a range of about 0.4 to about 10. In another example, the ratio (A/B) may be about 0.6 or more, 0.8 or more, 1 or more, 1.2 or more, 1.4 or more, 1.6 or more, 1.8 or more, or 2 or more, and about 9 or less, 8 or less, 7 or less, 6 or less, 5 or less, 4 or less, 3 or less, or 2 or less.

Thickness properties as described above may be advantageous in securing desired physical properties.

The decorative layer of the decorative material may also include a printed layer. The printed layer may be formed on the adherend-dependent peel force variable layer in the decorative layer. For example, in the structure of FIG. 1, the printed layer may be present on a surface opposite to the surface of the decorative layer 200 facing a base material layer 100 and/or the surface of the decorative layer 200 facing a base material layer 100. In one example, the printed layer may be formed on a surface where the resin emulsion is mainly present in the adherend-dependent peel force variable layer.

The printed layer may be formed in a known manner without particular limitation. The printed layer may be formed by applying, for example, a known gravure printing method.

In an appropriate example, the printed layer may be a layer formed by a so-called digital printing method. Thus, the printed layer may be a digital printed layer. A method of forming the digital printed layer is not particularly limited, and the digital printed layer may be formed by applying a known digital printing method.

The digital printing is a known printing method, which is a non-contact printing method using an electrical signal-controlled ink ejection method, and is advantageous for small/mass production of various types, and has excellent design freedom and quality. When the digital printing method is applied, a full-width design that cannot be realized by the gravure printing method can be realized, and since there is no limit to the number of colors that can be realized unlike the gravure printing method, multi-color can be realized using various colors. In addition, the digital printing method can produce a delicate softening effect that is difficult to realize with the gravure printing method, and a so-called 3D effect can be realized. In addition, according to the digital printing method, precise focus adjustment is possible, and if desired, the reality of natural materials such as fabric or wood can be maximized.

In particular, in the present application, it is possible to form a higher quality printed layer by forming the printed layer on the above-mentioned adherend-dependent peel force variable layer by the digital printing method.

For example, in the decorative material of the present application, a size of an ink dot of the ink forming the printed layer may be controlled within a range of 10 μm to 100 μm. The ink dot size can be obtained by observing the printed layer with a Digital Microscope (Dino-Lite), capturing a shape (image) seen on a monitor, inputting a measurement ratio, measuring an actual dot size, and measuring a diameter of a sphere. Through the ink dot size control, it is possible to form a clear and beautiful printed layer with a more precise focus. In another example, a size of the ink dot may be about 15 μm or more or 20 μm or more, and about 90 μm or less, 80 μm or less, 70 μm or less, 60 μm or less, 50 μm or less, 45 μm or less, 40 μm or less, 35 μm or less, or 30 μm or less.

The printed layer may exhibit excellent color coordinate properties. The color coordinates are coordinates in the CIE color space, which is a color value defined by Commossion International de l'Eclairage (CIE), and an arbitrary position in the CIE color space can be expressed as three coordinate values L*, a*, b*.

The L* value indicates brightness, and when L* is 0, black is obtained, and when L* is 100, white is obtained. The a* value indicates whether the color having the corresponding color coordinate is biased toward pure magenta or pure green, and the b* value indicates whether the color having the corresponding color coordinate is biased toward pure yellow or pure blue.

Specifically, the a* value has a range of −a* to +a*, the maximum value of a* (a* max) represents pure magenta, and the minimum value of a* (a* min) represents pure green. When the value of a* is a negative number, it means a color biased towards green, and when it is a positive number, it means a color biased towards red. For example, when a*=80 and a*=50 are compared, it means that a*=80 is closer to pure red than a*=50.

The b* value has a range of −b* to +b*. The maximum value of b* (b* max) represents pure yellow, and the minimum value of b* (b* min) represents pure blue. When the value of b* is a negative number, it means a color biased towards pure blue, and when it is a positive number, it means a color biased towards pure yellow. For example, when b*=80 and b*=20 are compared, it means that b*=80 is closer to pure yellow than b*=20.

In addition, the term "color deviation" or "color coordinate deviation" means a distance between two colors in the CIE color space. That is, the greater the distance, the greater the color difference, and the shorter the distance, the less difference in color, which can be expressed as ΔE* represented by Equation 1 below.

$$\Delta E^*=\sqrt{(\Delta L^*)^2+(\Delta a^*)^2+(\Delta b^*)^2} \quad \text{[Equation 1]}$$

For the decorative material, a color difference value measured in SCI mode using a CM-5 chromameter may have a red color difference value in the range of 35.2 to 35.5 and a blue color difference value in the range of 31.2 to 31.5, and a yellow color difference value in the range of 45.1 to 45.6.

In addition, referring to the difference in color difference values according to the presence or absence of the adherend-dependent peel force variable layer in the decorative material, it is possible to clearly specify a* for red and b* for blue and yellow.

For example, a* of red measured in SCI mode using a CM-5 colorimeter on a surface of the decorative material may be in the range of 14.5 to 15.5. In addition, b* of yellow measured in SCI mode using a CM-5 chromameter on the surface of the decorative material may be in the range of 18.0 to 19.0.

In addition, a portion seen as a feature of the color difference value can be compared with the b* value of yellow. For example, in the case where the adherend-dependent peel force variable layer is not present, b* of yellow is 6.09, and in the case where the adherend-dependent peel force variable layer is applied, b* is 18.24, and these values can differ by about two fold. It can be seen that better color development (yellow as b* goes toward+) is exhibited when the adherend-dependent peel force variable layer is present.

The printed layer may be formed on the adherend-dependent peel force variable layer using a known printing method (for example, a digital printing method).

The digital printing method is usually performed using water-based ink.

For the expression of desired physical properties, for example, the above-described adhesive performance, when the printed layer is formed on the adherend-dependent peel force variable layer, a polyurethane-based resin may be included in the printed layer and/or the adherend-dependent peel force variable layer. In addition, when the printed layer is formed on the ink receiving layer, the polyurethane-based resin may be included in the printed layer and/or the ink receiving layer.

The polyurethane-based resin component may enable the decoration layer to more strongly adhere to the base material layer. In this case, a known polyurethane may be used as the polyurethane without particular limitation. Usually, a reaction product of a polyol and isocyanate is applied as polyurethane, but in the present application, polyurethane to which a polyester polyol, polyether polyol or polycarbonate polyol is applied may be used as a polyol, and in a suitable example, polyurethane to which a polycarbonate polyol is applied may be used, but is not limited thereto.

As the polyurethane, for example, one having a weight average molecular weight (Mw) of about 5,000 to 100,000 may be used. In another example, the weight average molecular weight may be about 7,000 or more, 9,000 or more, 11,000 or more, 13,000 or more, 15,000 or more, 17,000 or more or 19,000 or more, and about 90,000 or less, 80,000 or less, 70,000 or less, 60,000 or less, 50,000 or less, 40,000 or less, or 30,000 or less.

As the polyurethane, one having a glass transition temperature of about 0° C. or less, −5° C. or less, −10° C. or less, −15° C. or less, or −20° C. or less, and about −100° C. or more, −90° C. or more, −80° C. or more, −70° C. or more, −60° C. or more, −50° C. or more, −40° C. or more, or −30° C. or more may be used.

By applying such a polyurethane, a desired effect can be secured more advantageously.

When included, the polyurethane may be applied in an amount of about 50 to 200 parts by weight, relative to 100 parts by weight of the resin emulsion of the adherend-dependent peel force variable layer or the ink receiving layer. Under this amount, the polyurethane can exhibit desired properties. In another example, the amount may be about 60 parts by weight or more, 70 parts by weight or more, 80 parts by weight or more, 90 parts by weight or more, 100 parts by weight or more, or 105 parts by weight or more, and 190 parts by weight or less, 180 parts by weight or less, 170 parts by weight or less, 160 parts by weight or less, 150 parts by weight or less, 140 parts by weight or less, 130 parts by weight or less, 120 parts by weight or less, or 115 parts by weight or less A method of including the polyurethane in the printed layer, the ink receiving layer and/or the adherend-dependent peel force variable layer is not particularly limited. For example, ink forming the printed layer and/or a component forming the ink receiving layer or the adherend-dependent peel force variable layer may include polyurethane.

For example, a method of including the polyurethane in an appropriate amount in ink forming the printed layer may be used. That is, the polyurethane may be included in ink (for example, water-based ink) usually applied to a digital printing method. At this time, the polyurethane may be formulated into the ink at a level where a proportion of the above-described resin emulsion is secured and the ink can exhibit printable physical properties. For example, the polyurethane may be formulated into the ink at a level at which a viscosity in the range of about 1 to 10 mPa·s and/or a surface tension of about 10 to 60 N/m can be exhibited, and for example, the polyurethane may be formulated so that the amount of the polyurethane in the ink may be about 10 to 90% by weight.

The decorative material may further include other necessary layers in addition to the base material layer and the decorative layer.

For example, the decorative material may include a so-called white layer between the base material layer and the decorative layer. This white layer is a layer usually applied in manufacture of the decorative material in order to further enhance the color of the printed layer. There is no particular limitation on the type of material forming the white layer, and it can be formed using known materials. For example, the white layer can be formed using polyvinyl chloride. Thus, the white layer may include polyvinyl chloride. A thickness of the white layer can also be selected from an appropriate range. FIG. 2 is a view showing a case where a white layer 300 is present between the base material layer 100 and the decoration layer 200.

The decorative material may also include an appropriate transparent layer on the decorative layer as a layer protecting the decorative layer. FIG. 3 is a view showing a case where a transparent layer 400 is present on the decorative layer 200 of the decorative material of FIG. 1. The type of material forming the transparent layer is not particularly limited, and for example, the transparent layer including a known material such as PVC may be used. Accordingly, the transparent layer may include polyvinyl chloride in one example. A thickness of the transparent layer may also be selected within an appropriate range, and, for example may be adjusted within a range of about 0.05 mm to 1.0 mm. Within this range, an appropriate protective effect can be exhibited without excessively increasing the thickness of the decorative material.

The decorative material may further include an appropriate layer for protecting the surface, for example, a known UV coating layer, alone or along with the transparent layer. The UV coating layer is also called a so-called ultraviolet curable coating layer.

In addition, the decorative material may further include a so-called balance layer (dimensional stability layer) in consideration of dimensional stability or a construction layer on at least one surface of a base material layer, for example, a surface on which the decorative layer is not formed. A balance layer is, for example, a portion that is adhered to the construction surface, and may serve to protect the surface of the decorative material and prevent moisture. A known material may be used as a material for forming the balance layer without particular limitation. In addition, a thickness of the balance layer may be adjusted to an appropriate range, and for example, an appropriate thickness may be selected within a range of about 0.01 mm to about 3.0 mm.

One exemplary decorative material of the present application may include at least some of the above-described components. For example, the decorative material of the present application may include the above-described white layer; the printed layer formed on one surface of the white layer; the ink receiving layer formed on the printed layer; and the transparent layer formed on the ink receiving layer.

In addition, the decorative material may further include the above-described primer layer between the ink receiving layer and the transparent layer.

In addition, the decorative material may further include a coating layer, for example, the above-described UV coating layer, on the transparent layer.

Detailed descriptions of the white layer, the printed layer, the ink receiving layer, the primer layer, the transparent layer, and the coating layer are as described above.

Accordingly, in one example, the ink receiving layer may include the resin emulsion, and the primer layer may include the silicone or fluorine compound and the polyvinyl chloride. Proportions of these components, a thickness of the layer, and the type of other components that may be included in the layer are also described above.

In addition, the exemplary decorative material may exhibit a peel strength of 1.6 kgf/2.0 cm or more at a peel angle of 180 degrees and a peel rate of 200 mm/min. The meaning of the peel strength is the same as the above-described peel strength of the decorative layer to the base material layer.

In addition, an ink dot size of the printed layer on the surface of the decorative material may be in the range of 10 to 100 μm, and a detailed description thereof is also the same as the above-described ink dot size.

In addition, the decorative material may further include the base material layer formed on the other surface of the white layer.

The present application also relates to a transfer film. The transfer film may be, for example, used for manufacturing the decorative material. The transfer film may include, for example, a base material film; and an adherend-dependent peel force variable layer formed on the base material film. The printed layer may be further included on at least one surface of the adherend-dependent peel force variable layer in the transfer film, for example, a surface opposite to the surface of the adherend-dependent peel force variable layer facing the base material film.

In another example, the transfer film may include the base material film; the ink receiving layer formed on the base material film; and the printed layer formed on the ink receiving layer.

In the above structure, the primer layer may further be present between the base material film and the ink receiving layer.

In the transfer film, detailed descriptions of other elements other than the base material film are as described above.

Thus, for example, in the transfer film, the adherend-dependent peel force variable layer (or the ink receiving layer and/or the primer layer) can simultaneously exhibit high adhesive strength and low adhesive strength depending on an adherend surface.

For example, the adherend-dependent peel force variable layer (or the ink receiving layer and/or the primer layer) may exhibit low adhesive strength to the base material film in the transfer film. For example, the adhesive strength of the adherend-dependent peel force variable layer (or the ink receiving layer and/or the primer layer) to the base material film may be about 1,000 gf/inch or less. In another example, the adhesive strength may be 950 gf/inch or less, the lower limit is not particularly limited, and for example, may be 50 gf/inch or more, 100 gf/inch or more, 150 gf/inch or more, 200 gf/inch or more, 250 gf/inch or more, 300 gf/inch or more, 350 gf/inch or more, 400 gf/inch or more, 450 gf/inch or more, 500 gf/inch or more, 550 gf/inch or more, 600 gf/inch or more, 650 gf/inch or more, 700 gf/inch or more, 750 gf/inch or more, 800 gf/inch or more, or 850 gf/inch or more.

The adhesive strength may be evaluated in the same manner as the above-described peel strength of the decorative layer to the base material layer. However, in this case, when the peel strength of the decorative layer to the base material layer is evaluated, the content of a base material layer becomes the content of the base material film. In addition, when measuring the adhesive strength, a process of maintaining a specimen in hot water at about 80° C. for about 1 hour is not performed.

The type of base material film in which the adherend-dependent peel force variable layer (or the ink receiving layer and/or the primer layer) exhibits the adhesive strength is not particularly limited, and a known film may be applied. For example, the base material film may be a polyester film such as a PET film. There is no particular limitation on the thickness or the like of the base material film.

The adherend-dependent peel force variable layer (or the ink receiving layer and/or the primer layer) may exhibit low adhesive strength to the base material film and high adhesive strength to the PVC layer. In one example, the PVC layer may be a surface of the base material layer. The adhesive strength (peel strength) to the PVC layer may be, for example, 1.6 Kgf/2.0 cm or more, 1.8 Kgf/2.0 cm or more, 2.0 Kgf/2.0 cm or more, 2.2 Kgf/2.0 cm or more, 2.4 Kgf/2.0 cm or more, 2.6 Kgf/2.0 cm or more, 2.8 Kgf/2.0 cm or more, 3.0 Kgf/2.0 cm or more, 3.2 Kgf/2.0 cm or more, 3.4 Kgf/2.0 cm or more, 3.6 Kgf/2.0 cm or more, 3.8 Kgf/2.0 cm or more, or 4.0 Kgf/2.0 cm or more. An upper limit of this peel strength is not particularly limited, but may usually be about 10 Kgf/2.0 cm or less, 9 Kgf/2.0 cm or less, 8 Kgf/2.0 cm or less, 7 Kgf/2.0 cm or less, 6 Kgf/2.0 cm or less, 5 Kgf/2.0 cm or less, 4.5 Kgf/2.0 cm or less, or 4 Kgf/2.0 cm or less.

The method for measuring the peel strength is the same as the method for measuring the base material layer of the above-described decorative layer.

Details of each component of the transfer film, for example, the adherend-dependent peel force variable layer (or the ink receiving layer and/or the primer layer) and the printed layer are the same as the adherend-dependent peel force variable layer (or the ink receiving layer and/or the primer layer) and the printed layer of the above-described decorative material.

That is, the decorative material may be manufactured by transferring the adherend-dependent peel force variable layer (or the ink receiving layer and/or the primer layer) and/or the printed layer of the transfer film to the base material layer.

The present application also relates to a method of manufacturing a decorative material using the transfer film.

According to the present application, the above-described decorative material can be manufactured through a transfer process. Through this method, it is possible to effectively form a printed layer in a new method such as, for example, a digital printing method, without significantly changing an existing decorative material manufacturing process. In addition, the present application may manufacture a decorative material having excellent adhesive strength without using a material that may generate harmful substances such as an adhesive through the above-described adherend-dependent peel force variable layer. In addition, when the transfer process is applied, damage to the decorative material due to heat or the like can be avoided during the process, and since the decorative material can be obtained by transfer after forming the printed layer, dependence on the flatness of a lower base material layer can be reduced, and costs due to defects in the process can also be reduced.

This method may include, for example, contacting the adherend-dependent peel force variable layer of the transfer film with the base material layer; and removing the base material film of the transfer film.

A specific method of performing the method is not particularly limited, and a known method may be applied.

For example, when using the transfer film including the base material film, the ink receiving layer, and the printed layer, the method may include transferring a printed layer of a transfer film onto a base material layer to be attached; removing a base material film from the transfer film; and forming a transparent layer on an ink receiving layer from which the base material film is removed.

In addition, when the printed layer is formed on one surface of the adherend-dependent peel force variable layer, in the step of contacting the adherend-dependent peel force variable layer with the base material layer, the base material layer may be brought into contact with a surface on which the printed layer of the adherend-dependent peel force variable layer is formed, or a surface on which the printed layer is not formed.

The type of base material layer applied in the process is not particularly limited, and the base material layer of the above-described decorative material may be used. The above-described white layer and/or balance layer may be formed on the base material layer. When the white layer is formed, the adherend-dependent peel force variable layer may come into contact with the white layer.

After the base material film is removed after the above step, necessary known processes may be performed. For example, the transparent layer or the UV coating layer may be additionally formed after the base material film is removed.

Advantageous Effects

The present application can provide a decorative material, a transfer film, and a manufacturing method of the decorative material. The present application can provide a decorative material in which a printed layer having various designs and colors to meet demands and needs is formed on a base material layer to have clearness and high adhesive strength.

The present application can provide a decorative material in which the above printed layer is formed using a transfer method that does not use an adhesive. The present application can provide a transfer film suitable for manufacturing the decorative material and a manufacturing method of the decorative material using the film.

BEST MODE FOR IMPLEMENTATION OF THE INVENTION

Figure 1:
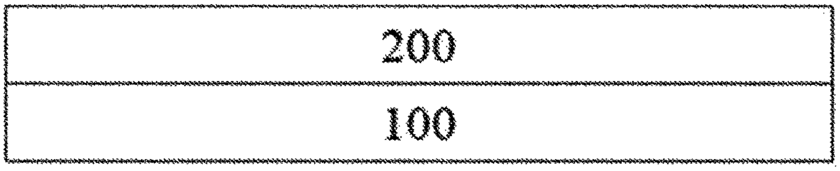
FIGS. 1 to 3 are schematic diagrams showing a structure of an exemplary decorative material.
Figure 2:
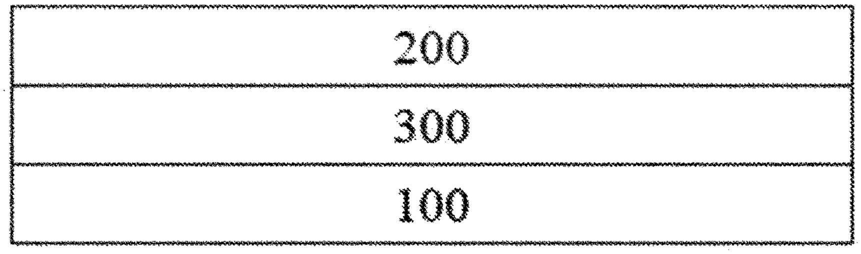
Figure 3:
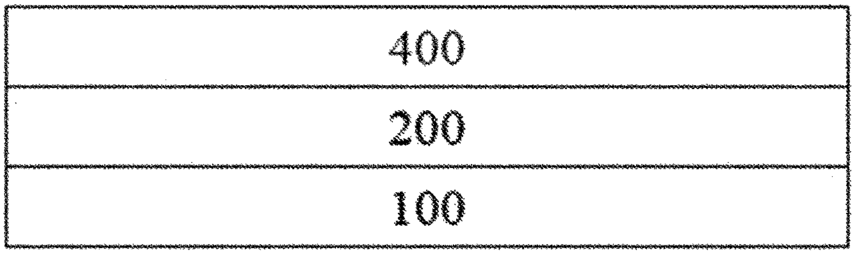

Although the present application is specifically described through the following examples, the scope of the present application is not limited by the following examples.

Example 1

Manufacture of Transfer Film

Two kinds of coating solutions were prepared to form an adherend-dependent peel force variable layer having a two-layer structure. Evonik's Protect 5000 product and PVC as a silicone-based compound were dissolved in water as a solvent in a weight ratio of about 5:4 (silicone-based compound: PVC) to prepare a first coating solution. At this time, PVC having a weight average molecular weight of about 26,000 was used.

Meanwhile, a cationic acrylic resin emulsion, $MgCl_2$ as a metal salt, silica (average particle diameter (D50 particle diameter): about 1.8 μm), and other components (thickener, leveling agent, and antifoaming agent) were mixed with water as a solvent in a weight ratio of (resin emulsion:metal salt:silica:other components) of 6:0.5:3:0.5 to prepare a second coating solution.

The cationic acrylic resin emulsion was formed by polymerizing methyl methacrylate, butyl acrylate, and hydroxyethyl methacrylate as monomers in water in a weight ratio of about 1:1:1, wherein acetic acid used as a surfactant was used in about 10 parts by weight, relative to 100 parts by weight of the total monomers.

First, the first coating solution was coated on one surface of a PET film, and maintained at a temperature of 80° C. for 15 seconds to form a first layer (primer layer) having a thickness of about 1 μm. Then, the second coating solution was coated on the first layer, and maintained at a temperature of 130° C. for about 1 minute to form a second layer (ink receiving layer) having a thickness of about 2 μm, so that an adherend-dependent peel force variable layer having a two-layer structure was formed.

The adherend-dependent peel force variable layer was formed so that about 30% by weight of the cationic acrylic resin emulsion were included, and a weight ratio of the cationic acrylic resin emulsion and the silicone compound was about 6:5 (resin emulsion: silicone compound).

Then, a printed layer was formed on the adherend-dependent peel force variable layer. The printed layer was formed by a digital printing method. At this time, ink obtained by mixing water-based ink LK series products obtained from Ink Tech Co., Ltd. and polyurethane in a weight ratio of about 6.6:3.5 (polyurethane: ink product) was used as ink. At this time, the polyurethane prepared using a polycarbonate polyol and having a glass transition temperature of about −25° C. was used.

In the same manner as described above, a transfer film in which a base material film, an adherend-dependent peel force variable layer, and a printed layer were sequentially formed was manufactured.

A proportion of the polyurethane in the adherend-dependent peel force variable layer of the transfer film was about 22% by weight, and a weight ratio of the resin emulsion and the polyurethane was about 6:6.6 (resin emulsion: polyurethane).

Manufacture of Decorative Material

A decorative material was manufactured using the transfer film. In the manufacture of the decorative material, a base material layer having a typical PVC white layer formed on one surface of a PVC board usually used as a base material layer for flooring materials, and a typical balance layer formed on the other surface was used as the base material layer.

The adherend-dependent peel force variable layer of the transfer film was brought into contact with the white layer of the base material layer. Then, after the base material film was peeled off, a PVC transparent layer and a UV coating layer were formed on the surface where the base material film was peeled off to manufacture the decorative material.

Example 2

A decorative material was manufactured in the same manner as in Example 1, except that a coating solution including no PVC was used as a first coating solution.

Example 3

A decorative material was manufactured in the same manner as in Example 1, except that ink not mixed with polyurethane was used as ink.

Comparative Example 1

A decorative material was manufactured in the same manner as in Example 1, except that ink not mixed with polyurethane was used as ink, and a coating solution including no PVC was used as a first coating solution.

Test Example 1

Peel Strength Evaluation

Figure 6:
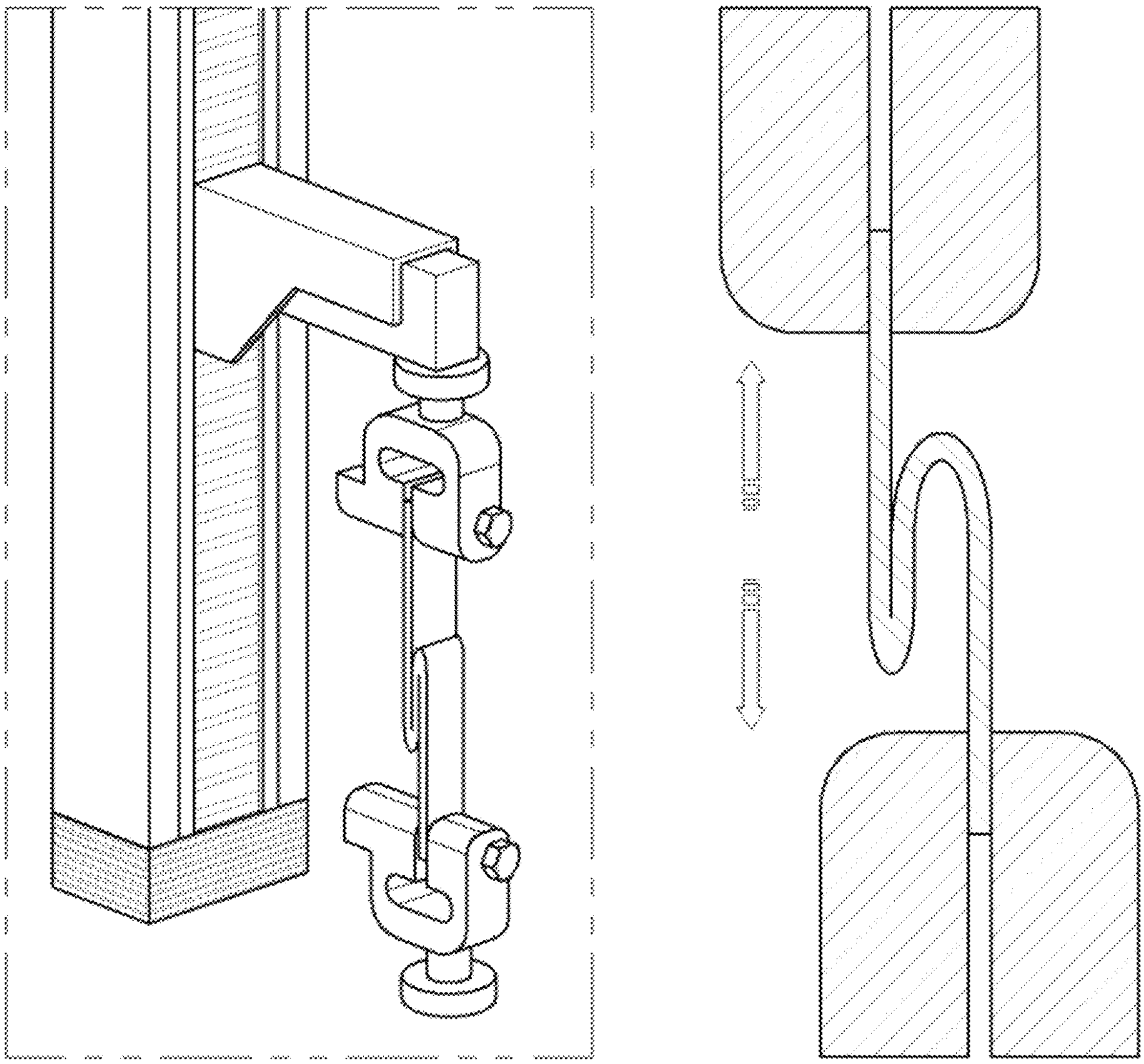
FIG. 6 is a view showing a process of measuring peel strength.

A peel strength of the decorative layer to the base material layer in the decorative material was evaluated by referring to KS M 3802, decoration laboratory test standard. First, a specimen was manufactured by cutting the decorative material into a dogbone shape having a width of 20 mm, a length of 250 mm, and a thickness of about 5 mm. Then, the specimen was kept in hot water at about 80° C. for about 1 hour. Then, both ends of the specimen were fixed in a tensile tester, and the peel strength was measured at a peel rate of about 200 mm/min and a peel angle of 180 degrees. FIG. 6 is a view showing a process of measuring the peel strength.

A small tensile tester of AMATEK LLOYD INSTRUMENTS was used as the tensile tester used in the above process, and a 5 kN load cell was used as a load cell.

When the peel strength was measured through the above method, the strength at the time when interlayer peeling occurred in an arbitrary layer or when a mono-layer was torn and damaged was taken as the peel strength.

Test Example 2

Adhesive Strength Evaluation

The adhesive strength of an adherend-dependent peel force variable layer (=first layer+second layer) to a PET film as a base material film in a transfer film was evaluated in the same manner as in Test Example 1. However, in this case, the process of maintaining the specimen in hot water at about 80° C. for about 1 hour was not performed.

First, a specimen was manufactured by cutting a transfer film into a dogbone shape having a width of 20 mm, a length of 250 mm, and a thickness of about 5 mm. Then, both ends of the specimen were fixed in a tensile tester, and the adhesive strength was measured at a peel rate of about 200 mm/min and a peel angle of 180 degrees.

A small tensile tester of AMATEK LLOYD INSTRUMENTS was used as the tensile tester used in the above process, and a 5 kN load cell was used as a load cell.

When the adhesive strength was measured through the above method, the strength at the time when interlayer peeling occurred in an arbitrary layer or when a mono-layer was torn and damaged was taken as the adhesive strength.

Test Example 3

Ink Dot Size Measurement

The ink dot size of a printed layer was confirmed as follows. After a shape (image) seen on a monitor was captured by observing a printed layer at a magnification of 230× using Dino equipment (microscope) and software (Dinocapture), a measurement ratio was input, an actual dot size was measured, and the size of the dot was obtained by measuring a diameter in a spherical shape.

Figure 4:
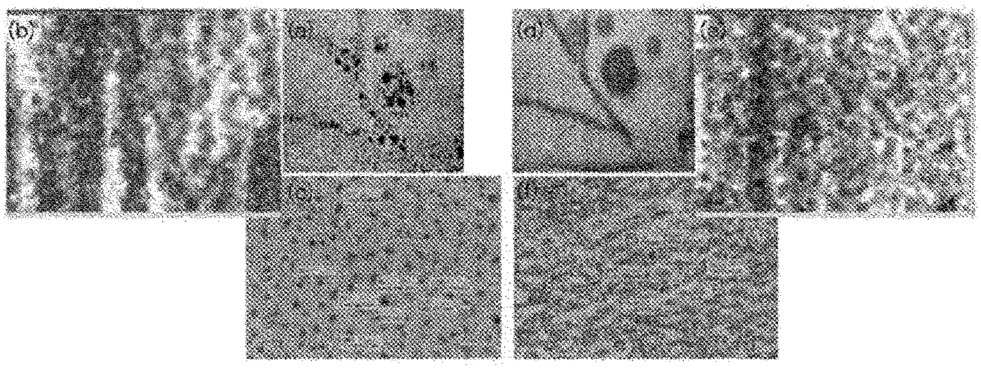
FIG. 4 is a view showing the results of comparing ink dot sizes of an example and a comparative example.

FIG. 4 is an image of the printed layer confirmed in this way, FIGS. 4A to 4C are images of Comparative Example 1, and FIGS. 4D to 4F are images of Example 1.

Test Example 4

CIE Color Coordinate Measurement

The CIE color coordinates of each case of Example 1 and Comparative Example 1 were measured.

At this time, the color coordinates were evaluated using a Konica Minolta's CN-5 instrument. In addition, when forming the printed layer, red, blue, and yellow colors were printed and color coordinates and color difference values were evaluated.

Figure 5:
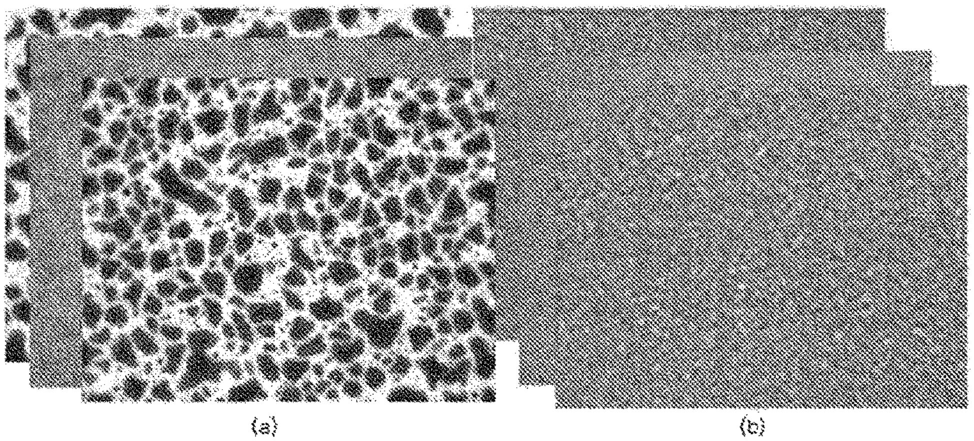
FIG. 5 is a view showing results of comparing CIE color properties of decorative materials.

FIG. 5 is a view showing such results, FIG. 5B is results for an example, and 5A is results for the comparative example.

In the case of applying a method of Example 1, for a red color difference value, a blue color difference value, and a yellow color difference value of the decorative layer were measured in an SCI mode using a CM-5 chromameter, a* of red is about 13.8, b* of yellow was about 18.2, and b* of blue was about −13.4.

The results of Test Examples 1 to 3 were summarized and described in Table 1 below.

TABLE 1

| | Peel strength | Adhesive strength | Ink dot size |
|---|---|---|---|
| Example 1 | About 4.0 Kgf/ 2.0 cm or more | About 900 gf/inch | About 20 to 30 μm |
| Example 2 | About 3.0 Kgf/ 2.0 cm or more | About 900 gf/inch | About 20 to 30 μm |
| Example 3 | About 2.0 Kgf/ 2.0 cm or more | About 900 gf/inch | About 35 μm |
| Comparative Example 1 | About 1.0 Kgf/ 2.0 cm or less | About 900 gf/inch | About 40 μm |

In Table 1, the peel strength is a peel strength of the decorative material to the base material layer, and the adhesive strength is an adhesive strength of the adherend-dependent peel force variable layer film in the transfer film to the base material film.

From the results of Table 1, in the present application, it can be confirmed that the adhesive strength varies depending on the adherend, the adherend-dependent peel force variable layer suitable for a transfer process is effectively formed with such a change in adhesive strength, and printability of the variable layer is also excellent.

In addition, as a result of confirmation according to the KS M 0000-1 standard, an amount of generated TVOC was 0.08 mg/m$^3$ or less per hour, and an amount of generated formaldehyde was 0.01 mg/m$^3$ or less per hour for all decorative materials of the examples and comparative example.

The invention claimed is:

1. A decorative material, comprising:

a base material layer; and a decorative layer formed on the base material layer, wherein the decorative layer comprises a printed layer and an adherend-dependent peel force variable layer, wherein an adhesive strength of the decorative layer to the base material layer is 1.6 kgf/2.0 cm or more at a peeling angle of 180 degrees and a peeling speed of 200 mm/min, and a peel strength of the adherend-dependent peel force variable layer with respect to a PET base material film is 1,000 gf/inch or less.

2. The decorative material of claim 1, wherein a generation amount per hour of total volatile organic compounds TVOC) is 5 mg/m$^3$ or less, and a generation amount per hour of formaldehyde is 0.1 mg/m$^3$ or less.

3. The decorative material of claim 1, wherein the printed layer or the adherend-dependent peel force variable layer comprises polyurethane.

4. The decorative material of claim 1, wherein the adherend-dependent peel force variable layer comprises a silicone resin or a fluorine compound; and a resin emulsion, wherein the resin emulsion is included in the adherend-dependent peel force variable layer in a ratio of 70 to 170 parts by weight, relative to 100 parts by weight of the silicone resin or the fluorine compound.

5. The decorative material of claim 4, wherein the adherend-dependent peel force variable layer further comprises 30 to 130 parts by weight of polyvinyl chloride, relative to 100 parts by weight of the silicone resin or the fluorine compound.

6. The decorative material of claim 4, wherein the adherend-dependent peel force variable layer further comprises 1 to 20 parts by weight of a metal salt, relative to 100 parts by weight of the resin emulsion.

7. The decorative material of claim 4, wherein the adherend-dependent peel force variable layer further comprises 10 to 100 parts by weight of an inorganic filler, relative to 100 parts by weight of the resin emulsion.

8. The decorative material of claim 1, further comprising a transparent layer formed on the decorative layer and including polyvinyl chloride.

9. The decorative material of claim 1, further comprising a white layer formed between the decorative layer and the base material layer and including polyvinyl chloride.

10. A decorative material comprising:

a white layer;

a printed layer formed on one surface of the white layer;

an ink receiving layer formed on the printed layer;

a primer layer formed on the ink receiving layer; and a transparent layer formed on the ink receiving layer, wherein a peel strength of the ink receiving layer or the primer layer with respect to a polyvinyl chloride base material layer is 1.6 kgf/2.0 cm or more at a peel angle of 180 degrees and a peel rate of 200 mm/min, and a peel strength of the ink receiving layer or the primer layer with respect to a PET base material film is 1,000 gf/inch or less.

11. The decorative material of claim 10, further comprising a coating layer on the transparent layer.

12. The decorative material of claim 10, wherein the ink receiving layer comprises a resin emulsion, and the primer layer comprises a silicone or fluorine compound and polyvinyl chloride.

13. The decorative material of claim 1, wherein an ink dot size on a surface of the decorative material is 10 to 100 μm.

14. The decorative material of claim 10, further comprising a base material layer formed on the other surface of the white layer.

15. A transfer film comprising:

a base material film; and an adherend-dependent peel force variable layer formed on the base material film, wherein a peel strength of the adherend-dependent peel force variable layer to the base material film is 1,000 gf/inch or less, and an adhesive strength of the adherend-dependent peel force variable layer to a polyvinyl chloride layer is 2.0 kgf/2.0 cm or more at a peeling angle of 180 degrees and a peeling speed of 6 inch/min.

16. The transfer film of claim 15, further comprising a printed layer on the adherend-dependent peel force variable layer, wherein the printed layer or the adherend-dependent peel force variable layer comprises polyurethane.

17. The transfer film of claim 15, wherein the adherend-dependent peel force variable layer comprises a silicone resin or a fluorine compound; and a resin emulsion, wherein the resin emulsion is included in the adherend-dependent peel force variable layer in a ratio of 70 to 170 parts by weight, relative to 100 parts by weight of the silicone resin or the fluorine compound.

18. The transfer film of claim 17, wherein the adherend-dependent peel force variable layer further comprises 30 to 130 parts by weight of polyvinyl chloride, relative to 100 parts by weight of the silicone resin or the fluorine compound.

19. The transfer film of claim 17, wherein the adherend-dependent peel force variable layer further comprises 1 to 20 parts by weight of a metal salt, relative to 100 parts by weight of the resin emulsion.

20. The transfer film of claim 17, wherein the adherend-dependent peel force variable layer further comprises 10 to 100 parts by weight of an inorganic filler, relative to 100 parts by weight of the resin emulsion.

21. A transfer film comprising:

a base material film;

a primer layer formed on the base material film;

an ink receiving layer formed on the primer layer; and a printed layer formed on the ink receiving layer, wherein a peel strength of the primer layer or the ink receiving layer to the base material film is 1,000 gf/inch or less, and an adhesive strength of the primer layer or the ink receiving layer to a polyvinyl chloride layer is 2.0 kgf/2.0 cm or more at a peeling angle of 180 degrees and a peeling speed of 6 inch/min.

22. The transfer film of claim 21, wherein the ink receiving layer comprises a resin emulsion, and the primer layer comprises a silicone or fluorine compound and polyvinyl chloride.

23. A manufacturing method of a decorative material, comprising:

contacting the adherend-dependent peel force variable layer of the transfer film of claim 15 with a base material layer; and removing a base material film from the transfer film.

24. A manufacturing method of a decorative material, comprising:

transferring the printed layer of the transfer film of claim 21 onto a white layer to be attached;

removing a base material film from the transfer film; and forming a transparent layer on an ink receiving layer from which the base material film is removed.

* * * * *